United States Patent [19]

Ginsburgh et al.

[11] 4,210,867

[45] Jul. 1, 1980

[54] INDUCTION COIL METHOD FOR DETECTING UNDERGROUND FLAME FRONTS

[75] Inventors: Irwin Ginsburgh, Morton Grove; John D. McCollum, Naperville, both of Ill.

[73] Assignee: Standard Oil Company (Indiana), Chicago, Ill.

[21] Appl. No.: 925,176

[22] Filed: Jul. 17, 1978

[51] Int. Cl.² .............................................. G01V 3/00
[52] U.S. Cl. .................................. 324/323; 324/57 Q
[58] Field of Search ............................. 324/1, 3, 5–7, 324/9, 10, 62, 57 R, 57 Q, 71

[56] References Cited

U.S. PATENT DOCUMENTS

| 2,012,479 | 8/1935 | Planta | 324/9 X |
|---|---|---|---|
| 2,035,943 | 3/1936 | Broughton-Edge | 324/7 X |
| 3,031,762 | 5/1962 | Parker . | |
| 3,329,891 | 7/1967 | Todd | 324/10 |
| 3,454,365 | 7/1969 | Lumpkin et al. . | |
| 3,483,730 | 12/1969 | Gilchrist et al. . | |
| 4,045,724 | 8/1977 | Shuck et al. | 324/6 |

OTHER PUBLICATIONS

Satter, Abdus, *Application of Infrared Sensing to Track Thermal Flood Fronts*, Pan American Petroleum Corp. Memorandum, May 4, 1967.

Kazemi et al., *Locating a Burning Front by Pressure Transient Measurements*, Soc. of Petrol. Engnrs. of AIME., Paper No. SPE1271, Oct. 1965.

van Poolen, H. K., *Transient Tests Find Fire Front in an in Situ-Combustion Project*, Oil and Gas Journal, vol. 63, No. 5, Feb. 1, 1965, pp. 78-80.

*Primary Examiner*—Gerard R. Strecker
*Attorney, Agent, or Firm*—Ronald C. Petri; William T. McClain; William H. Magidson

[57] ABSTRACT

Disclosed is a method for detecting the flame front during the in situ combustion of a subterranean carbonaceous stratum which involves providing at least one multi-turn coil of wire on the surface of the ground electrically connected into one or more circuits in which an electrical resonance condition is established, and monitoring the change in impedance in one or more of said circuits as an indication of the extent and movement of said flame front.

8 Claims, 2 Drawing Figures

MODIFIED WHEATSTONE BRIDGE METHOD

FIG. 1
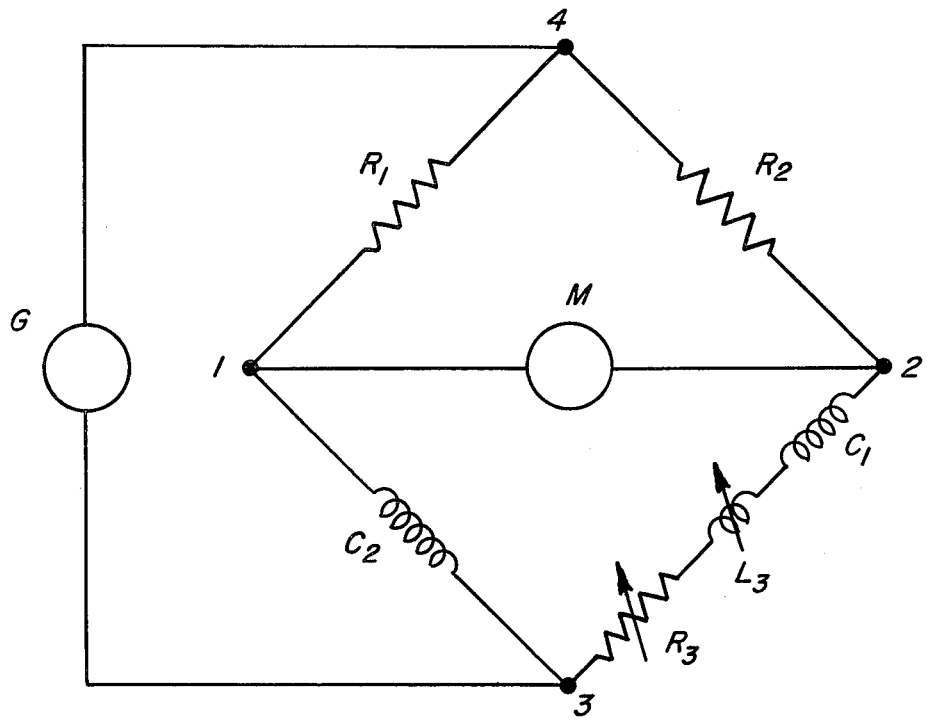
MODIFIED WHEATSTONE BRIDGE METHOD
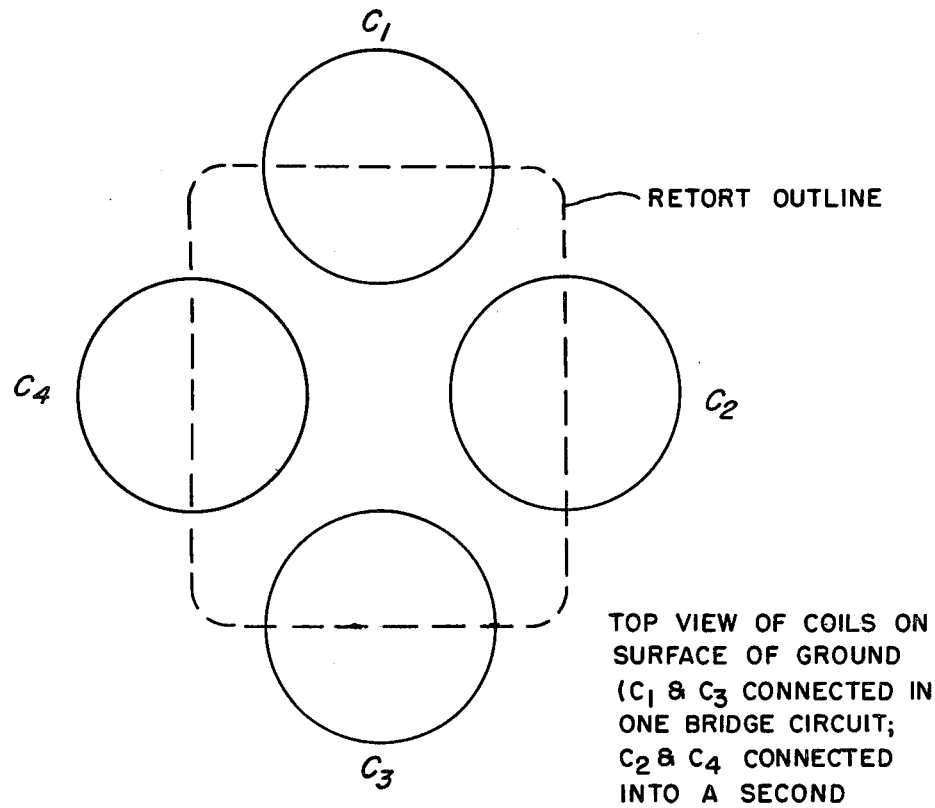
TOP VIEW OF COILS ON SURFACE OF GROUND ($C_1$ & $C_3$ CONNECTED IN ONE BRIDGE CIRCUIT; $C_2$ & $C_4$ CONNECTED INTO A SECOND BRIDGE CIRCUIT)
FIG. 2

INDUCTION COIL METHOD FOR DETECTING UNDERGROUND FLAME FRONTS

BACKGROUND

1. Field of the Invention

This invention relates to a method of monitoring the progress and pattern of a combustion or flame front being advanced through a combustible subterranean carbonaceous stratum. In particular, this invention relates to a method of monitoring both the vertical and lateral movement of an underground flame front. More particularly, this invention relates to a method of monitoring the pattern and spatial orientation of a flame front during in situ retorting of oil shale.

2. Description of the Prior Art

The term oil shale refers to sedimentary deposits containing organic materials which can be converted to oil shale. Oil shale contains an organic material called kerogen which is a solid carbonaceous material from which shale oil can be retorted. Upon heating oil shale to a sufficient temperature, kerogen is decomposed and a liquid product is formed.

Oil shale can be found in various places throughout the world, especially in the United States in Colorado, Utah and Wyoming. Some especially important deposits can be found in the Green River formation in Piceance Basin, Garfield and Rio Blanco counties, and northwestern Colorado.

Oil shale can be retorted to form a hydrocarbon liquid either by in situ or surface retorting. In surface retorting, oil shale is mined from the ground, brought to the surface, and placed in vessels where it is contacted with hot retorting gases. The hot retorting gases cause shale oil to be freed from the rock. Spent retorted oil shale which has been depleted in kerogen is removed from the reactor and discarded.

In situ combustion techniques are being applied to shale, tar sands, Athabasca sand and other strata in virgin state, to coal veins by fracturing, and to strata partially depleted by primary and even secondary and tertiary recovery methods.

In situ retorting oil shale generally comprises forming a retort or retorting area underground, preferably within the oil shale zone. The retorting zone is formed by mining an access tunnel to or near the retorting zone and then removing a portion of the oil shale deposit by conventional mining techniques. About 5 to about 40 percent, preferably about 15 to about 25 percent, of the oil shale in the retorting area is removed to provide void space in the retorting area. The oil shale in the retorting area is then rubblized by well-known mining techniques to provide a retort containing rubblized shale for retorting.

A common method for forming the underground retort is to undercut the deposit to be retorted and remove a portion of the deposit to provide void space. Explosives are then placed in the overlying or surrounding oil shale. These explosives are used to rubblize the shale and preferably form rubble with uniform particle size. Some of the techniques used for forming the undercut area and the rubblized area are room and pillar mining, sublevel caving, and the like.

After the underground retort is formed, the pile of rubblized shale is subjected to retorting. Hot retorting gases are passed through the rubblized shale to effectively form and remove liquid hydrocarbon from the oil shale. This is commonly done by passing a retorting gas such as air or air mixed with steam and/or hydrocarbons through the deposit. Most commonly, air is pumped into one end of the retort and a fire or flame front initiated. This flame front is then passed slowly through the rubblized deposit to effect the retorting. Not only is shale oil effectively produced, but also a mixture of off-gases from the retorting is also formed. These gases contain carbon monoxide, ammonia, carbon dioxide, hydrogen sulfide, carbonyl sulfide, and oxides of sulfur and nitrogen. Generally a mixture of off-gases, water and shale oil are recovered from the retort. This mixture undergoes preliminary separation (commonly by gravity) to separate the gases, the liquid oil, and the liquid water. The off-gases commonly also contain entrained dust and hydrocarbons, some of which are liquid or liquefiable under moderate pressure. The off-gases commonly have a very low heat content, generally less than about 100 to about 150 BTU per cubic foot.

One problem attending shale oil production in in situ retorts is that the flame front may "channel" through more combustible portions of the rubble faster than others. The resulting uneven passage of the flame can leave considerable portions of the rubblized volume bypassed and unproductive. Such channeling can result from non-uniform size and density distributions in the rubblized shale. If the shape of the flame front can be defined or packing variations detected within the retort, then channeling and its effects can be mitigated by controlling the air injection rate and oxygen content into various sectors of the retort, or by secondary rubblization if regions of poor density can be mapped.

A variety of prior art techniques have been established for determining the position and progress of underground combustion. These techniques range from indirect theoretical mathematical formulations on the one hand to rather simplistic direct measurements that can be done at the combustion site on the other. One example of the mathematical treatment can be found in a paper ("Locating a Burning Front by Pressure Transient Measurements," Paper No. SPE 1271) by Hossein Kazemi delivered at the October, 1965, Society of Petroleum Engineers Conference. Kazemi disclosed a method by which the distance from a measuring point to the combustion front could be calculated employing pressure transient measurements. In particular, the pressure fall-off observed at the bottom of the well hole in either injected liquid or in effluent gases could be related to the approach of a combustion front. Such pressure build-up and fall-off measurements were also described by H. K. Van Poolen in the Feb. 1, 1965 Oil and Gas Journal, Vol. 63, No. 5.

An equally elaborate technique was described by Dr. A. M. Feder in 1967 ("Infrared Sensing: New Way to Track Thermal Flood Fronts," World Oil (April 1967), p. 142) using an infrared system to locate subterranean thermal fronts by flying an infrared sensor over the investigated area. Thermal energy from a sub-surface heat source (combustion or steam-fronts) may be transferred to the terrain surface by conduction through the overburden formation, or by movement of heated water or gases to the surface via fractures. Infrared imaging would then be useful to identify the hot portions of the surface terrain. This method however is only a gross estimate of the position of an underground thermal front and does not yield reliable data on its depth, extent or movement.

Parker discloses in U.S. Pat. No. 3,031,762 the periodic measurement of the elevation of the ground at one or more points directly above the path of a combustion front until the ground at this point rises. Such a rise is interpreted to indicate the arrival of the combustion front directly under the elevated point. This method is dependent on the fact that combustion of a carbonaceous stratum causes an expansion of the stratum which is substantially immediately translated to a rise in the elevation of the ground surface directly over the expanded stratum. This method is uniquely applicable to combustion fronts which are primarily vertical and which move in a horizontal direction. Combustion fronts in the horizontal plane that propagate vertically would simply result in a roughly symmetrical elevated area with no information provided concerning the depth or speed of the front.

Parker also teaches in U.S. Pat. No. 3,072,184 a fuel pack in which separate masses of gas forming materials are spaced in the fuel pack at predetermined distances. Thus as the fuel pack burns it releases identifiable gases at spaced intervals which, when detected in the effluent gases, can be related to the progress of the combustion front in that particular fuel pack. This method is primarily useful in well bores and is not readily amenable to application in underground retorting.

U.S. Pat. No. 3,454,365 issued to Lumpkin et al discloses a method in which the gas from in situ combustion process is analyzed for its oxygen, carbon dioxide, hydrogen and hydrocarbon content. A small sample stream from the hot effluent during in situ combustion is treated, condensed and dried. It is subsequently analyzed to determine the relative concentrations of the various off-gases. This concentration level is then rationalized through a control computer which controls the air injection rate to maintain an optimum utilization of the oxygen in the air stream and to optimize the in situ cracking process. This process is directed primarily towards detecting the efficiency or effectiveness of the combustion process within the retort, and does not provide usable information concerning the speed, progress, extent or location of the flame front within the retort.

In U.S. Pat. No. 3,467,189, Dingley also employs a sample-and-analysis technique to detect the approach of a flame front. Physical properties such as the water to air ratio of the formation fluids which enter a production well are monitored, as well as the hydrogen ion concentration and the salinity of the water and the specific gravity of the liquid hydrocarbons. A signal indicating the close proximity of the combustion front to the production well is provided when limiting or static values are reached at the same time in any two of the physical properties of the formation fluids entering the production valve.

U.S. Pat. No. 3,483,730, issued to Gilchrist et al, employs thermocouples to monitor the change in temperature of the overburden near the ground surface at a plurality of points spaced around the point at which the combustion is initiated. These thermocouples respond to changes in temperature of the overburden during the heat movement of the underground combustion and thereby detect lateral movement of the flame front.

Related to the teachings of U.S. Pat. No. 3,483,730 is a method involving down-hole placement of temperature-sensing devices which indicate a sharp rise in temperature as the flame front arrives at the locus of the temperature-sensing device. One disadvantage in this method lies in the fact that the extremely high temperatures of the combustion front frequently destroy the temperature-sensing apparatus. Another disadvantage is in the cost of drilling holes to the formation level.

The technique of self-potential profiling, long used to locate mineral deposits, has recently been found to be useful as a tool for locating buried geothermal reservoirs. This technique involves the detection of small self-potential voltages which result from natural earth currents. Two metal stakes are placed in conductive ground and connected to a sensitive voltmeter which detects the generation of electromotive force in the surrounding rocks due to increases in temperature. The effective range of this method is somewhat limited and dependent upon a large area of thermal variation to generate a measurable voltage. In an underground retort however, very poor electrical coupling exists between the rubble and the retort walls. It is expected that any self-potential voltages generated within the retort will be poorly transmitted to the walls. Therefore, the self-potential voltages detectable by the surface sensors will be primarily those generated from the immediately adjacent retort walls-a much smaller thermal source than the entire flame front. This significantly reduces the efficacy of this method in underground retorting. Like the infrared imaging technique this method adequately detects the presence of thermal anomolies, but provides little information concerning the depth or movement of such thermal fronts.

Scientists at the Lawrence Livermore Laboratories have recently explored the use of high frequency electromagnetic probing to investigate underground anamolies. One application of the radiofrequency (RF) probing is to observe the progress of a burn front in the experimental underground coal gasification process. This technique involves lowering radio transmitters and receivers into bore holes drilled around the area of concern. Underground irregularities which have an effect on the passage of the RF waves can then be detected and located. Varying geological features, however, also affect the passage of the RF waves. In addition, underground water pockets, or any other interface causing a change in the dielectric constant, would also affect the passage of the RF waves. This method is therefore susceptible to interference caused by the presence of normal subterranean features.

It can be seen that the methods taught by the prior art are, in general, directed towards either (1) detecting lateral movement of a flame front, or (2) the vertical movement of a flame front, but not both. In addition, even those methods which are capable of detecting the directional movement and location of the front do not provide a means for ascertaining whether the front is tilted out of a desired orientation. Such tilts are undesirable as they can cause incomplete or inefficient combustion in the retort. In general, the prior art does not provide a means of detecting both the lateral and vertical location of a flame front, the speed with which the flame front is propagating through the carbonaceous stratum and the degree to which the front deviates from a desired horizontal or vertical plane. Once these parameters of the underground flame front are detected, various means can be employed to selectively speed up or hinder portions of this flame front to more efficiently effectuate the retorting process.

The general object of this invention is to provide a method of determining the progress and pattern of a combustion front in a carbonaceous stratum which avoids the aforesaid difficulties. A more specific object of this invention is to provide a method of determining both the vertical and lateral movement of an underground flame front. Another object of this invention is to provide a means of ascertaining the spatial orientation of the plane of an underground flame front.

SUMMARY OF THE INVENTION

The objects of this invention can be achieved through a method for detecting the flame front during the in situ combustion of a subterranean carbonaceous stratum which involves providing at least one multi-turn coil of wire on the surface of the ground electrically connected into one or more circuits in which an electrical resonance condition is established, and monitoring the change in impedance in one or more of said circuits as an indication of the extent and movement of said flame front.

The extent (i.e., the location and tilt) and movement of an underground flame front can be determined utilizing the fact that the electrical conductivity of a burning layer of material is greater than the conductivity of that same material prior to combustion. As previously noted, the rubblized shale in a retort makes poor electrical coupling with the solid walls of the retort. As the shale burns, however, the flame front becomes a better electrical conductor than both the unburnt rubble and the solid overburden. The net effect at the surface is that the flame front appears to be a plane of conducting material imbedded in the ground, a relative insulator. As the flame front burns through the retort, the conducting layer changes position with respect to the surface.

When a multi-turn coil of wire is made part of a resonant circuit, the resonant frequency of the circuit and coil can be measured. If a conductor is brought into the vicinity of the coil the impedance (a measure of both the resistance and inductance) of the coil, and consequently the resonant frequency of the coil circuit, is altered. This change in impedance or resonant frequency of a coil can be related to the position of the nearby conductor. In general, such coils are sensitive to conductors nearer than a few coil diameters away.

A key factor in applying this method to a variety of combustion sites is that the coils should be placed on the ground and resonance conditions achieved prior to the arrival or ignition of the flame front directly below the coils. A reference reading of the resonant frequency or resistance of the circuit is taken prior to any perturbations caused by the flame front. The flame front's progress and distance is then determined by noting deviations from the reference reading caused by the advance of the front.

In the simplest embodiment, a large diameter multi-turn coil is laid on the surface of the ground above an expected in situ combustion site, such as a retort and electrically connected to an oscillator, a frequency counter, and a means for detecting when electrical resonance occurs in the circuit. Resonant conditions are established in the circuit prior to initiation (or arrival) of the combustion front. The flame front appears to be a large conducting region in comparison with the insulating effects of the overburden and side walls. The presence of this conductor in the proximity of the coil alters the resistance of the coil, and thereby, the resonant frequency of the circuit. The change in impedance and/or resonant frequency of the circuit is monitored as the burn progresses through the retort, and the location of the front relative to the coil can be related to the magnitude of the change in the circuit's electrical characteristics.

Such an arrangement can be employed in any situation in which detection of an underground flame front is desired. The invention is therefore not limited to oil shale or retorting, but finds application in a variety of in situ combustion processes. In particular, this method can be employed to detect the flame front in cases where the combustion is expected to proceed laterally or even in cases where the direction of combustion is erratic or unknown. Limited only by the need to obtain an initial "flame-free" or reference reading, the coils can be placed ahead of the advancing front in lateral or horizontal combustion; or spaced in an array to track the progress of underground combustion with amorphous characteristics.

The preferred orientation of the combustion front is vertical, however. This is due to the fact that in vertical combustion the profile, or boundary, of the flame front as sensed at the surface is relatively well defined during the entire retorting process. Further, vertical combustion has the advantage that the immobile coil remains directly over the flame front for the duration of the combustion. Thus, this invention finds its most useful application in oil shale retorting.

BRIEF DESCRIPTION OF THE DRAWINGS

FIG. 1 is a schematic diagram of a modified Wheatstone Bridge circuit useful with this invention.

FIG. 2 is a schematic top view of four detecting coils on the surface of the ground above a retort.

DETAILED DESCRIPTION OF THE INVENTION

The effect of such a flame front on the resonance of a large coil is very small and direct quantitative measurements are generally difficult. Therefore, a method which is sensitive to small changes in the circuit is preferred. This is accomplished through the use of a bridge circuit. A typical bridge circuit may employ two identical coils—one located over the retort or combustion site and another reference coil a sufficient distance away to be unaffected by the combustion. A modified Wheatstone Bridge circuit is established, as shown in FIG. 1, wherein the two coils $C_1$ and $C_2$ are connected in a bridge with two known resistors $R_1$ and $R_2$. A variable resistor $R_3$ and a variable inductor, $L_3$, are connected in series with the coil $C_1$. For purposes of FIG. 1, $C_1$ is the sensing coil located over the flame front and $C_2$ is the reference coil; the roles of the coils may be reversed, however without substantially affecting the method. An alternating current is applied across the bridge by G. A sensitive meter, M, is connected into the bridge circuit as shown. In effect, M is a very sensitive galvanometer capable of detecting very small currents. There are four primary junction points in the circuit, labeled 1 through 4 in FIG. 1.

Such bridge circuits are very useful in detecting very small current or impedance variations. A so-called "balance" condition is first obtained by adjusting the variable components ($R_3$ and $L_3$) until meter M detects zero current. In this condition, the electrical potential at point 1 is equal to the electrical potential at point 2 and no current is flowing through M's portion of the circuit. The configuration of the circuit of FIG. 1 will be recognized as a modification of the familiar Wheatstone Bridge wherein one branch (1-3) contains a coil and another branch (3-2) contains a variable resistor, a variable inductor, and a coil. Adapting the well-known Wheatstone Bridge formula to the circuit of FIG. 1 results in the following relationship when balance is achieved:

$(R_{14}/R_{42}) = (R_{13}/R_{32})$ where $R_{14}$ is the effective impedance of the 1-4 branch of the bridge,
$R_{42}$ is the effective impedance of the 4-2 branch,
$R_{13}$ is the effective impedance of the 1-3 branch, and
$R_{32}$ is the effective impedance of the 3-2 branch.

Thus, any change in the effective impedance of any branch of the circuit will result in an imbalance of the bridge and a nonzero current reading at M. One advantage of a bridge circuit is that the sensitivity of the meter M can be chosen such that even a very small change in any branch of the circuit causes a relatively large deflection in M. As a consequence, a weak perturbation of the circuit can be made easily observable at M and distinguishable from all other background factors which do not directly affect the balance of the bridge.

In application, if a conductor is brought into the proximity of $C_1$, the effective impedance of $C_1$ is altered, thereby unbalancing the bridge and causing a nonzero reading at M. To reachieve balance, $R_3$ and $L_3$ are adjusted until M again reads 0. The amount of adjustment of $R_3$ and $L_3$ is related to the change in impedance of $C_1$ caused by the presence of the conductor. As the conductor is moved closer to or further away from $C_1$, changes in the balance of the bridge are detected at M. The speed of the movement of the conductor with respect to $C_1$ will also be reflected in the rate of change in the balance. Consequently, monitoring the speed and magnitude of the imbalance at M indicates the location and movement of the flame front. This method provides, therefore, a direct link between (1) the magnitude of the adjustment of $R_3$ which is necessary to re-establish balance, and (2) the proximity of a conducting flame front to coil $C_1$. It can be seen that either coil can be placed over the combustion site and used as the sensing coil. Regardless of which coil ($C_1$ or $C_2$) is used as the sensing coil, the principle remains valid, of course, that the adjustment of $R_3$ and $L_3$ required to regain balance is related to the proximity of the flame front to the sensing coil.

The presence of two variable components, $R_3$ and $L_3$, in the circuit is necessitated by the fact that a conductor near a resonating, alternating current (AC) coil affects the coil in two distinct ways. Both the resistance and the inductance of the coil are altered—the term commonly used to refer to the joint electrical properties of resistance and inductance in an AC circuit is "impedance." As both of these properties of the coil are affected, it is necessary to provide a means of adjusting each individually in order to reachieve balance conditions. Certain types of anomalies in the flame front (channeling, variations in thickness, variations in temperature) will affect the resistance of the coil more or less than the inductance of the coil. The ability to adjust and monitor each property therefore, provides greater sensitivity to detect some of the more subtle characteristics of the flame front.

The arrangement just described, wherein one coil is a reference coil and the other coil is the sensing coil located over a flame front yields information primarily only in one dimension. That is, the distance between the sensing coil and the flame front is readily obtained, but the orientation or tilt of the front remains generally unknown.

Information concerning the orientation of the flame front is obtained from another embodiment of this invention. Again employing the modified Wheatstone Bridge of FIG. 1, both coils are placed so that they are substantially symmetrical about the center and partially over the boundaries of the combustion site. When this embodiment is used in the retorting process, each coil is partially above the stratum to be burned and partially above the sidewalls of the retort. A balance is once again achieved prior to ignition or arrival of the flame front, and the balance monitored as the combustion progresses.

In the event that the portion of the flame front directly below $C_2$ burns at a different rate than the portion of the flame front directly below $C_1$, then the distance between the flame front and $C_1$ will be different than the corresponding distance for $C_2$. If, however, the front remains horizontally oriented, then each coil will "sense" substantially the same distance to the flame front; the flame front remains equidistant from both coils. This condition does not disturb the balance of the bridge because the resistance characteristics of the coils are affected to roughly the same degree in each coil. A "tilted" flame front, however, substantially unbalances the bridge because each coil is responding to a different distance to the conducting flame front. The degree of imbalance is related to the severity of the tilt. Further, whether the variable resistor, $R_3$, and variable inductor, $L_3$, need to be increased or decreased to regain balance conditions is related to whether the $C_1$-flame front distance is larger or smaller than the $C_2$-flame front distance. Consequently, monitoring the degree and direction of the imbalance of a two-coil bridge yields information concerning the spatial orientation of the flame front.

Another embodiment of the invention provides improved accuracy through the use of multiple bridge circuits. When arranged in an array as in FIG. 2, each coil partially lies over a portion of the underground retort. Opposite pairs ($C_1$ and $C_3$; $C_2$ and $C_4$) are connected in a bridge circuit, so that any imbalance existing in each pair is monitored. If coils $C_1$ and $C_3$ do not "feel" the presence of similar conductors, the $C_1$–$C_3$ bridge circuit will be unbalanced. Similarly, any discrepancy in the conductors individually sensed by coils $C_2$ and $C_4$ will result in an imbalance of the $C_2$–$C_4$ bridge circuit. Thus, if the plane of the flame front is horizontal (or all points of the conducting flame front are roughly equidistant from all coils), then both bridge circuits will remain balanced. If, however, one portion of the flame front has channeled ahead or lags behind the remainder, the conducting layer will appear tilted. This tilt will be reflected in an unbalanced condition in the coil immediately above the anomaly. As before, the degree and direction of the imbalance reveal the orientation of the flame front. The use of more than one pair of bridged coils allows more precise and detailed information concerning specific segments of the flame front.

While this invention has its preferable application to monitoring flame fronts in vertical retorts, it is equally applicable to other forms of underground combustion. Flame fronts proceeding horizontally, obliquely to the surface, or in several directions simultaneously can be monitored and tracked with an appropriate choice of single coil, bridged coil, and multiple bridge circuits providing scope and precision tailored to the circumstances.

An innovative way of establishing a very large diameter multi-turn coil over the vicinity of the retort is to lay a multi-strand cable in a large roughly circular pattern of the desired diameter. Once the loop is closed connectors can be placed on the two ends of the cable. Each connector has n pins, where n is the number of wire strands in the cable. Each strand runs from pin X in one connector to pin X+1 in the mating connector. The last pin on one connector and the first pin on the mating connector are then attached into the circuit. This allows the coil to be laid out in a loop as a single cable and connected into a coil after the loop is formed. In this way, engaging the connectors transforms one 100-strand cable, for instance, into a 100-turn coil.

The sensitivity of the coil is an important factor to consider when determining the dimensions of the necessary circuits. As previously noted, the coil can remain sensitive to the presence of a conductor within a distance of a few coil diameters. Thus, for instance, if it is expected that the overburden for the retort is to be 500 feet, and the height of the retort itself is to be 1000 feet, then the coil should be sensitive to the presence of the flame front as far away as the deepest portion of the carbonaceous stratum to be ignited, or 1500 feet. This would require that the coil have an approximate diameter of 500 feet. It is apparent that for coils of this size extraneous surface effects may interfere with or affect the signal. In particular, subterranean strata, certain ores, and horizontal aquifers may appear electrically conducting relative to the surrounding rock under certain conditions.

Effects from surface or underground factors may be alleviated by effective calibration techniques. One simple method of determining the nature and extent of extraneous "conductors" would be to simply establish resonance and/or balance conditions prior to ignition of the retort. These initial conditions would then be a reference point, establishing the magnitude and character of the "background" signals. In this way the signal change caused only by the flame front can be differentiated from conductivity changes caused by other factors.

To accurately determine the progress of the flame front and to ascertain its depth and tilt as well, it will be necessary to calibrate the circuits at least once using some more conventional detection means. Thus, a direct relationship can be empirically established and formulated between the distance to the flame front in feet, and the magnitude of the change in resonant frequency in cycles/second. Once this formula is obtained it may be applied to a variety of situations involving such coil detectors.

For normal operation the coils should be operated at frequencies between 10 kilohertz to one megahertz and preferably under 100 kilohertz. Higher frequencies are absorbed more readily by the surrounding earth and large coils do not respond well to lower frequencies.

While the invention has been described herein with respect to one, two and four coils, it is understood that those skilled in the art will recognize modifications and configurations involving any number of coils without departing from the scope of the invention. In addition, single coils and multiple coils in bridge circuits may be used in tandem correlated to provide information concerning the flame front of whatever precision and scope desired.

Accordingly, the foregoing description is to be construed as illustratively only, and is not to be construed as a limitation upon the invention as defined in the following claims.

I claim:

1. In the in situ combustion of a subterranean carbonaceous stratum, a method for detecting an underground flame front comprising
   (a) providing at least one stationary multi-turn coil of wire on the surface of the ground electrically connected into one or more circuits in which an electrical resonance condition is established;
   (b) continuously monitoring the change in impedance characteristics in one or more of said circuits as the combustion progresses and providing an indication of the location, speed, and vertical and lateral movement of said flame front in response to said monitored change in impedance characteristic.

2. The method of claim 1 wherein said coils have a diameter greater than one-third the depth of the deepest portion of the expected site of combustion.

3. The method of claim 2 wherein one coil is employed, placed directly above an expected site of in situ combustion, and the extent and movement of said flame is indicated by monitoring changes in the resonant frequency of said circuit.

4. The method of claim 2 wherein one or more of said circuits comprise a modified Wheatstone Bridge comprising at least four branches, wherein a first branch of said bridge contains a multi-turn coil, a second branch of said bridge contains a multi-turn coil, a variable resistor, and a variable inductor, and all other branches of said bridge contain one or more resistors having a predetermined resistance value.

5. The method of claim 4 employing one modified Wheatstone Bridge circuit comprising four branches and two coils wherein one of said coils is placed a sufficient distance away such that it is unaffected by the combustion of said carbonaceous stratum.

6. The method of claim 5 wherein the amount of adjustment of said variable resistor and said variable inductor required to maintain balance conditions in said bridge is correlated with the location and movement of said flame front.

7. The method of claim 4 wherein said coils are located substantially symmetrically about the center of a combustion site and partially over the boundaries of said combustion site.

8. The method of claim 7 wherein the amount of adjustment of said variable resistor and said variable inductor required to maintain balance conditions in said bridge is correlated with the extent and movement of said flame front.

* * * * *